United States Patent
Hanson et al.

(10) Patent No.: US 12,292,201 B2
(45) Date of Patent: May 6, 2025

(54) AIR FLOW CONTROL TECHNOLOGY FOR OVENS

(71) Applicant: QuickFire Technologies, LLC, Hudson, WI (US)

(72) Inventors: Robert Hanson, Hudson, WI (US); Noel Johnson, Stoughton, WI (US); Michael Powis, Oak Grove, MO (US)

( * ) Notice: Subject to any disclaimer, the term of this patent is extended or adjusted under 35 U.S.C. 154(b) by 454 days.

(21) Appl. No.: 17/357,846

(22) Filed: Jun. 24, 2021

(65) Prior Publication Data

US 2022/0018548 A1  Jan. 20, 2022

Related U.S. Application Data

(60) Provisional application No. 63/043,553, filed on Jun. 24, 2020.

(51) Int. Cl.
| | |
|---|---|
| *F24C 15/32* | (2006.01) |
| *F27D 7/04* | (2006.01) |
| *G05D 7/06* | (2006.01) |
| *A21B 1/24* | (2006.01) |
| *F27D 7/02* | (2006.01) |

(52) U.S. Cl.
CPC ............. *F24C 15/322* (2013.01); *F27D 7/04* (2013.01); *G05D 7/0682* (2013.01); *A21B 1/24* (2013.01); *F27D 2007/026* (2013.01)

(58) Field of Classification Search
CPC . A21B 1/24; F24C 15/322; F27D 7/04; F27D 2007/026; G05D 7/0682
USPC ...................................................... 126/21 A
See application file for complete search history.

(56) References Cited

U.S. PATENT DOCUMENTS

| | | | | |
|---|---|---|---|---|
| 4,308,853 A | * | 1/1982 | Thirode | F24C 15/325 |
| | | | | 219/391 |
| 4,831,238 A | * | 5/1989 | Smith | A23L 3/365 |
| | | | | 219/400 |
| 6,263,693 B1 | * | 7/2001 | Gladd, Sr. | A21B 1/26 |
| | | | | 34/225 |
| D770,358 S | | 11/2016 | Fernandez et al. | |
| D777,080 S | | 1/2017 | Cropley et al. | |
| 9,718,410 B2 | | 8/2017 | Cropley et al. | |
| D831,147 S | | 10/2018 | Cropley et al. | |
| D873,760 S | | 1/2020 | Connellan et al. | |
| D877,686 S | | 3/2020 | Connellan et al. | |
| D878,277 S | | 3/2020 | Connellan et al. | |
| D878,278 S | | 3/2020 | Connellan et al. | |
| D879,013 S | | 3/2020 | Connellan et al. | |

(Continued)

FOREIGN PATENT DOCUMENTS

| | | |
|---|---|---|
| CA | 3123161 | 12/2021 |

*Primary Examiner* — Steven B McAllister
*Assistant Examiner* — Benjamin W Johnson
(74) *Attorney, Agent, or Firm* — Smith Keane LLP; Joel D. Skinner

(57) ABSTRACT

A system and apparatus for controlling airflow in large industrial forced-convection ovens that are used for cooking, smoking, drying, and processing meat and food products. The system and apparatus reduce temperature, color, and yield variation within the ovens, and also reduce cooking times and power requirements. The system and apparatus use variable-width supply-air slots and dual, side-mounted return ducts to precisely control the airflow within the oven so that the air can be directed to the slowest cooking areas in the oven.

12 Claims, 20 Drawing Sheets

(56) References Cited

U.S. PATENT DOCUMENTS

2013/0036918 A1\* 2/2013 Sakane ................ F24C 15/322
99/358

\* cited by examiner

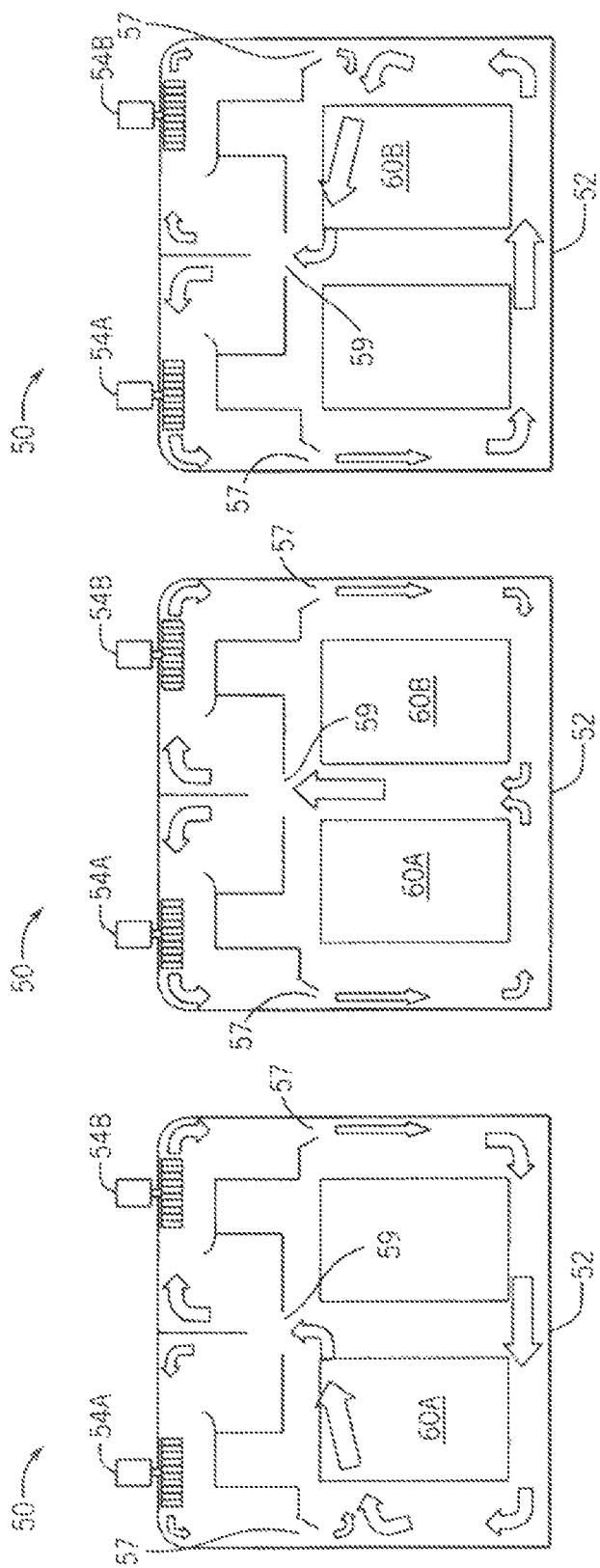

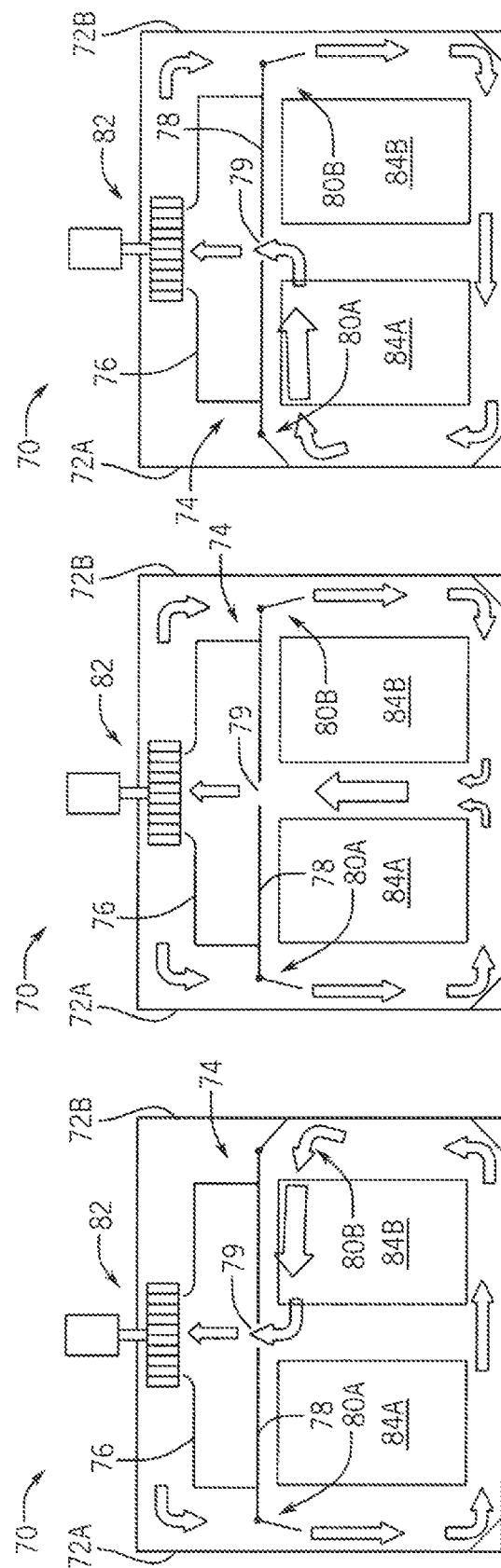

AIR FLOW CONTROL TECHNOLOGY FOR OVENS

CROSS-REFERENCE TO RELATED APPLICATIONS, IF ANY

This application claims the benefit under 35 U.S.C. § 119(e) of U.S. Provisional Patent Application Ser. No. 63/043,553, filed Jun. 24, 2020, which is hereby incorporated by reference.

37 C.F.R. § 1.71(E) AUTHORIZATION

A portion of the disclosure of this patent document contains material, which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to air flow control systems, apparatus, and methods. Particularly, the invention relates to air flow control systems in ovens. Most particularly, the invention relates to air flow control systems in large, commercial ovens used to cook, smoke, dry, and otherwise process meats and meat products.

2. Background Information

Existing technology in this field is believed to have significant limitations and shortcomings. For this and other reasons, a need exists for the present invention.

Industrial ovens have been used in the meat industry to cook, smoke, dry, or otherwise process meats. Conventional ovens, or smokehouses, typically have two supply-air ducts located on opposing sides of an oven cabinet, usually in the upper corners thereof. These supply-air ducts have either fixed-width supply slots or fixed-diameter orifice cones. A single recirculation fan forces air through the air supply slots or cones into a processing chamber of the cabinet. The two opposing air streams from the side mounted supply ducts meet at a turbulent-air interface known in the trade as the "breakpoint." The conventional designs use either a diverter vane or a linked tandem rotating-damper vane assembly to continuously vary the air velocities from the opposing supply ducts, causing the breakpoint to sweep or oscillate from side-to-side in the processing chamber like a pendulum. These oscillating airflow systems are generally single-speed systems that continuously sweep the air from side-to-side without varying the speed. Some oscillating airflow systems, however, include what is known in the trade as "pause timers," which stop or "pause" the breakpoint in two or more locations in the oven.

A primary purpose of sweeping process air from side-to-side in the oven is to minimize color and temperature variation inherent when large loads of meat products are cooked in the ovens. Oscillating airflow systems have many designs and names in the trade, including rotating dampers, wig-wag dampers, boat-rudder dampers, and the like. However, all of the oscillating airflow systems serve the same function, to sweep the hot air back-and-forth in the oven during cooking.

Referring to FIGS. 1 A-C and 2 A-C, one common design uses dual-vane rotary diverter dampers that divert the air from one supply duct to the other. Another design is a rotating damper system that uses two shaft/damper assemblies located in the opposing supply ducts that are connected using a chain drive assembly (FIG. 1) or shaft linkage assembly (FIG. 2). A motor drive rotates the damper blades during cooking, thus diverting the air from one supply duct to the other and sweeping the air from side-to-side in the oven.

Another design uses twin-fans, shown for example in FIG. 3 A-C. Each fan supplies air to one supply duct. Two independent electric motors are connected to electronic variable speed drives that are used to drive the two independent centrifugal fans. The variable speed drives are used to vary the fan speeds, thus sweeping the breakpoint from side to side in the oven. For example, if both fans are set to run at 100%, the two opposing airstreams will meet at the breakpoint at the bottom dead-center of the oven. However, if one fan is set at 100% while the other is set at 45%, these settings will direct the air to the upper-corner of the oven. If one fan is set at 100% and the other set to 55 or 65%, these settings will direct the air to the middle-side, or if the fan is set to 75 or 85%, the air will be directed to the bottom corner.

Regardless of the variation in design, all conventional ovens have one similar shortcoming, namely that a single Return Duct disposed in the center of the oven ceiling creates a "Cold Zone" at the upper-center of the product load. Referring to FIGS. 4 and 5, the centrally-located return duct sucks the air through the product to the top-center of the oven, which creates airflow patterns that produce one or more Cold Zones, and sometimes one or more corresponding "Hot Zones". Regardless of what air-handling system is used to sweep the air from side-to-side in the oven, the hot air from the supply ducts still cools as it flows through the product from the supply ducts to the central return duct. This leaves the product at the top-center of the oven continuously exposed to the coldest air in the oven. Oven designs that use conventional damper systems (FIGS. 1 and 2) have an additional disadvantage in that the dampers in the air stream block the airflow, resulting in a build-up of static pressure that wastes motor power.

All US patents and patent applications, and all other published documents mentioned anywhere in this application are incorporated by reference in their entirety.

BRIEF SUMMARY OF THE INVENTION

The invention provides an air moving system, apparatus, and method, which are practical, reliable, and efficient, and which are believed to fulfill a need and to constitute an improvement over the background technology. The invention also provides an oven that control airflow patterns, including variable-width supply slots to control air velocity and airflow volume through a forced-air industrial batch and continuous ovens. The invention further provides an oven including independent or linked control of the variable supply slot position and width of supply gap. The invention still further provides an oven including independent or linked control of supply slot rate of change position, and resulting change in width of variable-width supply slots. The invention yet also provides an oven including dual, side-mounted return ducts equipped with return-air dampers to control the airflow through the cold zones to speed cooking and reduce temperature and color variation. And the invention provides an oven including dual, side-mounted return ducts equipped with dual, independent main fans and variable speed drives, with or without dampers, to control the airflow through the cold zones to speed cooking and reduce temperature and color variation.

In one aspect, the invention provides an oven apparatus, including:
- a processing chamber adapted to contain food product to be processed;
- at least one fan disposed above the processing chamber;
- at least two air supply slots, separated a predetermined distance from each other, for transmitting air generated by the at least one fan to the processing chamber, each air supply slot having a predetermined airflow area;
- a blade disposed proximate each air supply slot for controlling the size of the air flow area; and
- at least one air return slot for returning air from the processing chamber to the fan.

In another aspect, the invention provides an oven apparatus, including:
- a processing chamber adapted to contain food product to be processed;
- at least one fan disposed above the processing chamber;
- two air supply slots, separated a predetermined distance from each other, for transmitting air generated by the at least one fan to the processing chamber, each air supply slot having a predetermined supply air flow area;
- a supply damper disposed proximate each air supply slot for controlling the size of the supply air flow area of the air supply slot;
- at least two air return slots for returning air from the processing chamber to the fan, the at least two air return slots being disposed between the two air supply slots, each air return damper having a predetermined return air flow area; and
- a return damper disposed proximate each air return slot for controlling the size of the return air flow area of the respective air return slot.

And in yet another aspect, the invention provides an oven apparatus, including:
- a processing chamber adapted to contain food product to be processed;
- at least two fans disposed above the processing chamber, each fan being independently controllable;
- an air supply slot disposed generally below each fan for transmitting air generated by the fan to the processing chamber, each air supply slot having a fixed predetermined supply air flow area; and
- an air return slot disposed generally below each for returning air from the processing chamber to the fan, each air return slot being disposed between the two air supply slots, each air return damper having a predetermined return air flow area.

The aspects, features, advantages, benefits, and objects of the invention will become clear to those skilled in the art by reference to the following description, claims, and drawings.

BRIEF DESCRIPTION OF THE SEVERAL VIEWS OF THE DRAWING

FIGS. 3A-C are diagrams showing a conventional twin-fan airflow design that varies the speeds of the two fans to sweep the air from side to side using variable fan speeds instead of dampers.

FIGS. 6 A-C are diagrammatic views of airflow patterns created using the variable-width supply duct arrangement of FIGS. 5 A-C.

DETAILED DESCRIPTION

1. Introduction

The present invention provides systems and apparatus for controlling airflow in ovens for processing meat and other food products, particularly in large, industrial, forced air convection ovens used for cooking, smoking, drying, or otherwise processing meats. The system and apparatus reduce temperature, color, and yield variation within the ovens, and also reduce cooking times and power requirements. The system and apparatus of the invention use variable-width supply-air slots technology and dual, side-mounted return duct technology to precisely control the airflow within the oven so that the air can be directed to the slowest cooking areas in the oven.

2. Example Embodiments

Details and features of the embodiments of the invention, including its parts, their interconnection, and the expected behavior and functions of the invention will be apparent by viewing the drawings in light of the following descriptions. Methods of making and using the embodiments will also be apparent to those skilled in the art from this disclosure.

Figure 1C:
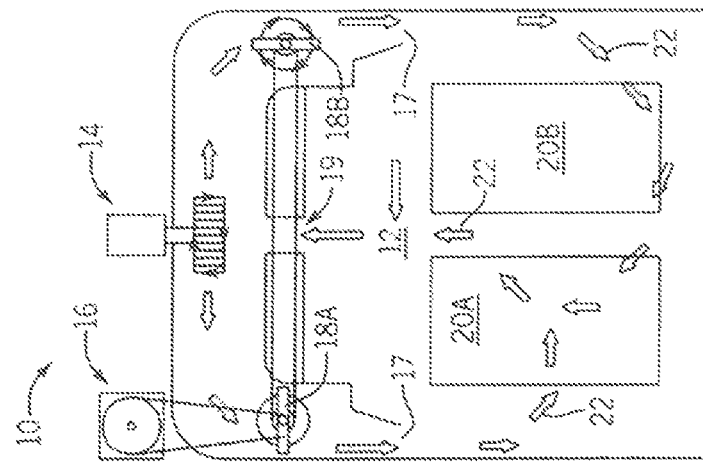
FIGS. 1A-C are diagrams showing a conventional chain-driven rotating-damper assembly that uses two perpendicular damper blades operating in tandem to sweep the air from a single fan in a side-to-side pattern in an oven.
Figure 1B:
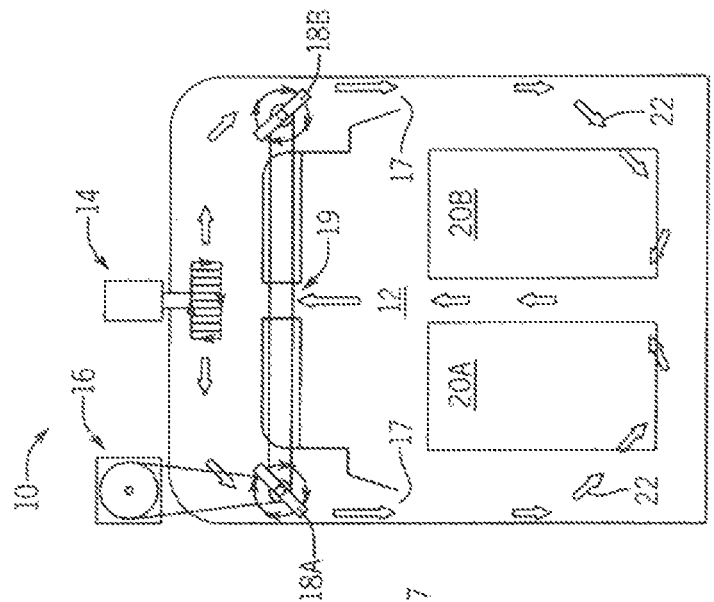
Figure 1A:
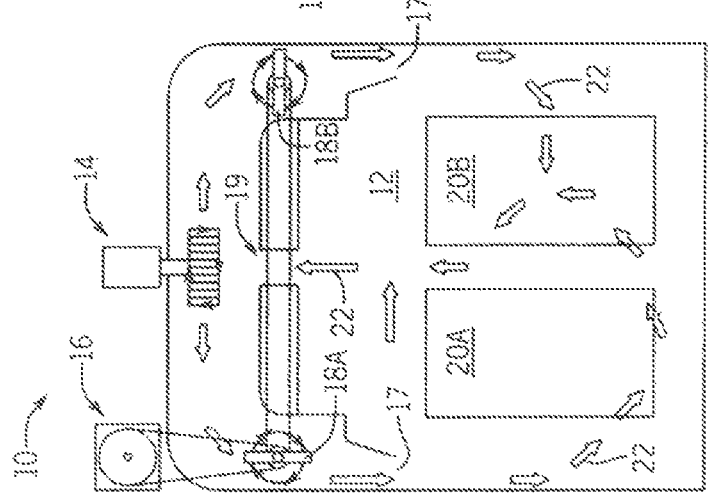

FIGS. 1-5 show, again, conventional devices. FIGS. 1 A-C are diagrams showing a conventional chain-driven rotating-damper type oven 10 that uses two perpendicular damper blades 18 A and B located at fixed width openings 17 disposed at opposing top corners of a processing chamber 12. The damper blades 18 operate in tandem to sweep the air 22 from side to side, through product loads 20 A and B, in the processing chamber 12 of the oven 10 having a single air fan 14. The dampers 18 are controlled by a chain drive assembly 16. Air is returned via a single, open, uncontrolled return duct 19 disposed centrally, in the top of the chamber 12. In FIG. 1A, damper 18A is fully open and damper 18B is fully closed, whereby breakpoint air is shifted to the right side of the chamber 12. In FIG. 1B, both dampers 18 are in a half open mode, whereby breakpoint air is centered in the chamber 12. In FIG. 1C, damper 18A is fully closed and damper 18B is fully open, whereby breakpoint air is shifted to the left side of the chamber 12.

Figure 2C:
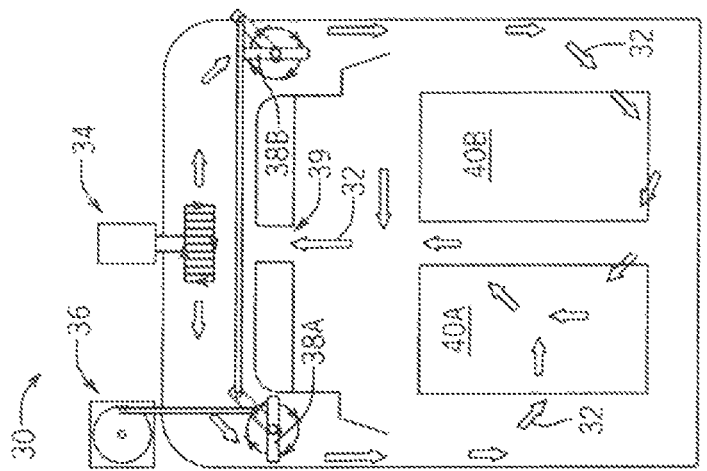
FIGS. 2 A-C are diagrams showing a conventional shaft-driven rotating-damper that uses two perpendicular damper blades operating in tandem to sweep the air from the single fan in a side-to-side manner in the oven.
Figure 2B:
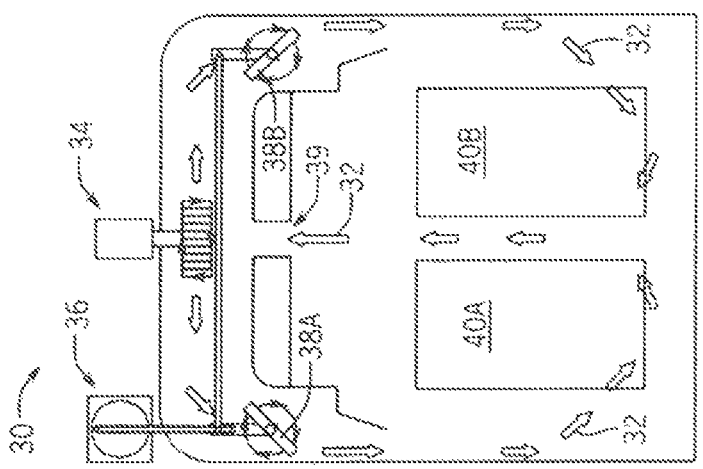
Figure 2A:
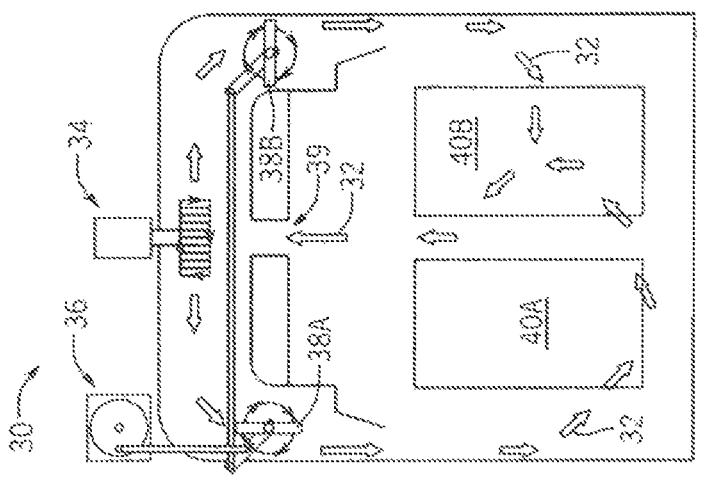

FIG. 2 A-C are diagrams showing a conventional shaft-driven rotating-damper type oven 30 that uses two perpendicular damper blades 38 A and B located at fixed width openings 37 disposed at opposing top corners of a processing chamber 32. The damper blades 38 operate in tandem to sweep the air 32 from side to side, through product loads 40 A and B, in the processing chamber 32 of the oven 30 having a single air fan 34. The dampers 38 are controlled by a shaft drive assembly 36. Air is returned via a single return duct 39 disposed centrally in the top of the chamber 32. In FIG. 2A, damper 38A is fully open and damper 38B is fully closed, whereby breakpoint air is shifted to the right side of the chamber 32. In FIG. 2B, both dampers 38 are in a half open mode, whereby breakpoint air is centered in the chamber 32. In FIG. 2C, damper 38A is fully closed and damper 38B is fully open, whereby breakpoint air is shifted to the left side of the chamber 32.

FIGS. 3 A-C are diagrams showing a conventional twin-fan airflow oven 50 that varies the speeds of the two fans 54 A and B to sweep the air from side to side using variable fan speeds instead of dampers. The fans 54 are located above fixed width openings 57 disposed at opposing top corners of a processing chamber 52. Air is returned via a single, open, uncontrolled return duct 59 disposed centrally, in the top of the chamber 52. In FIG. 3A, fan 54B is fully powered and fan 54A is reduced power, whereby breakpoint air is shifted to the left side of the chamber 52. In FIG. 3B, both fans 54 are fully powered, whereby breakpoint air is centered in the chamber 52. In FIG. 3C, fan 54A is fully powered and fan 54B is reduced powered, whereby breakpoint air is shifted to the right side of the chamber 52.

Figure 4:
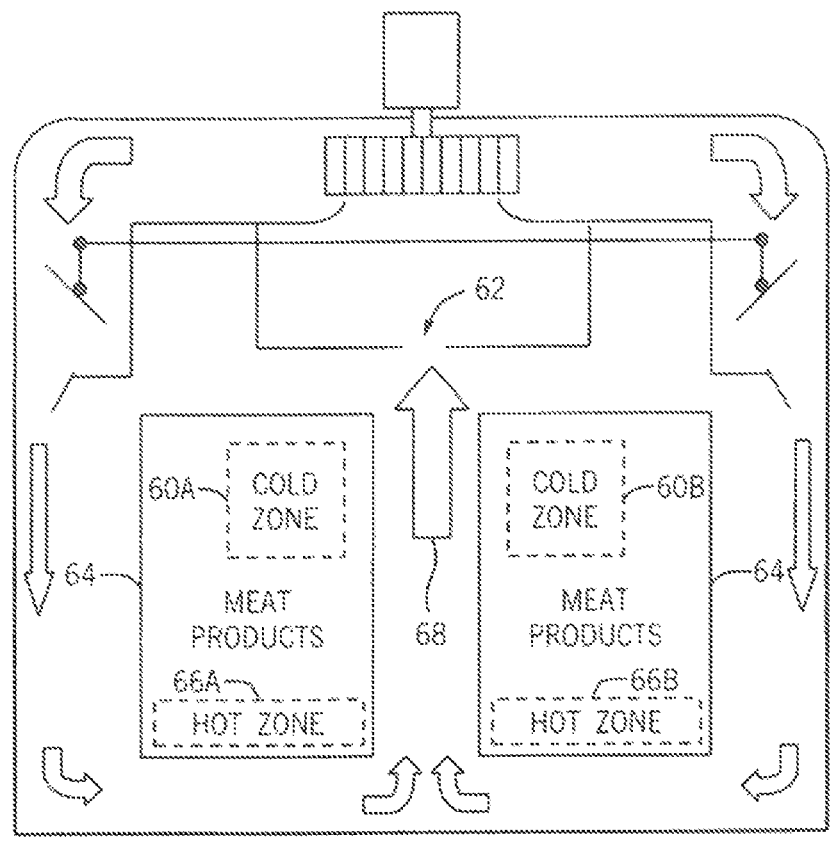
FIG. 4 is a diagram showing temperature patterns showing locations of one or more "Cold Zones" that are typical when using the conventional air-handling systems with a single return duct that is center-mounted on the ceiling of an oven, as shown in FIGS. 1-3.

FIG. 4 is a diagram showing temperature patterns showing locations of one or more "Cold Zones" 60 A and B that are typical due to center air flow 68 when using the conventional air-handling systems with a single return duct 62 that is center-mounted on the ceiling. The cold zones 60 may overlap with the food product 64, thus resulting in temperature and quality variation. One or more corresponding "Hot Zones" 66 A and B may also develop as a result of such air flow 68.

Figure 5A:
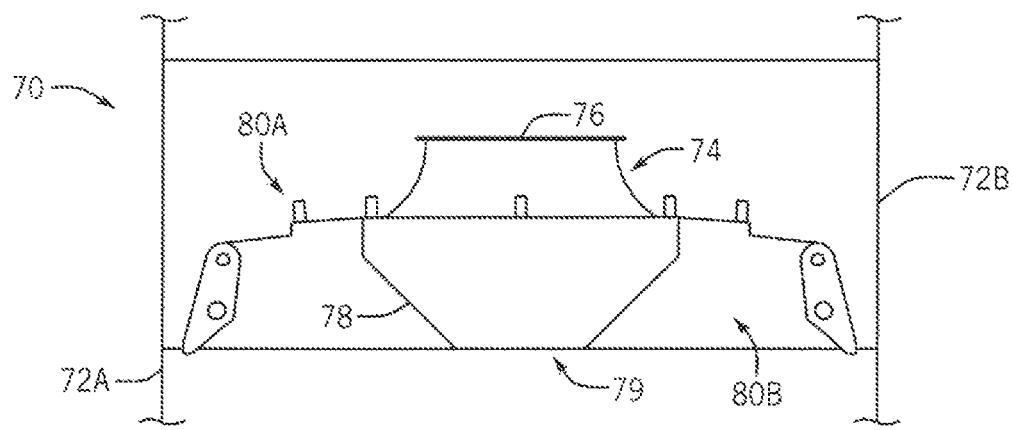
FIGS. 5 A-C are side, bottom perspective, and top perspective views, respectively, of a first, basic embodiment of a variable-width supply duct and system of the present invention, with a single fan.
Figure 5B:
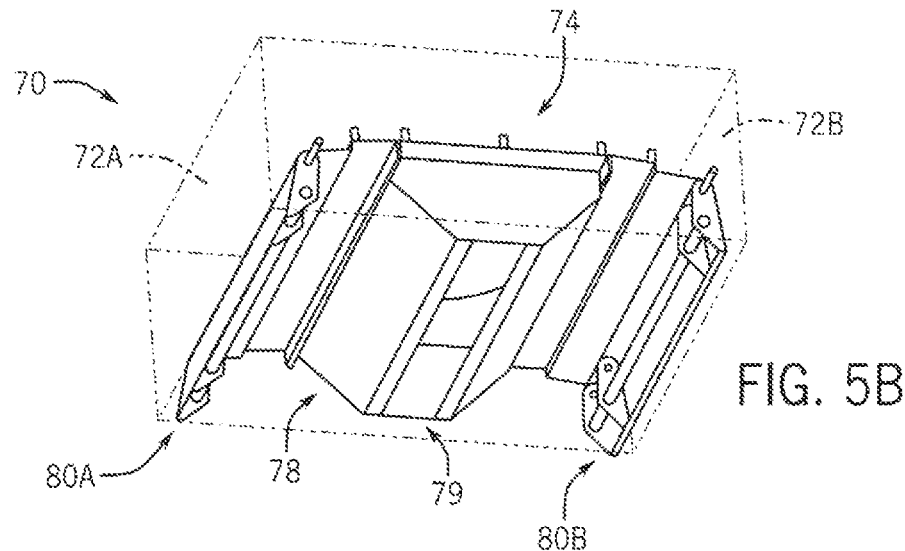
Figure 5C:
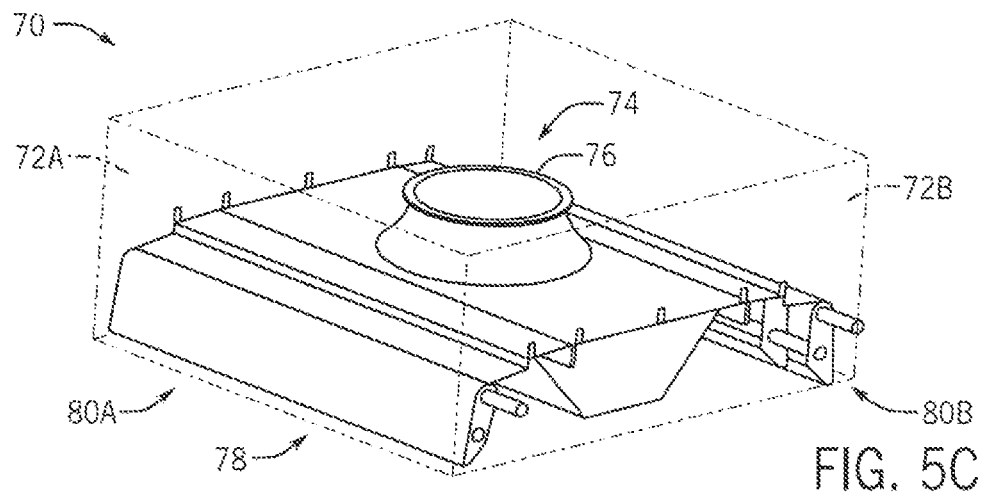

FIGS. 5 A-C are perspective views of a first embodiment of a variable-width supply duct and system 70 of the present invention for use in an industrial oven, smokehouse, or the like. The system 70 is disposed in a processing chamber having opposing side walls 72A and B and a single, centrally disposed fan (82 in FIGS. 6A-C). The system 70 includes a central housing 74 that preferably has a curvilinear upper member 76 and a rectilinear lower member 78. The lower member has a central return duct 79. Precision blade assemblies 80 A and B are connected to the housing 74 and extend a predetermined distance toward the side walls 72 A and B, respectively. The blade assemblies 80 are communicatively connected to independent actuators (shown in FIG. 7), which may be mechanical, electrical, or pneumatic type. The actuators control the width of the supply-air slots, thus controlling the velocity and volume of the incoming air from each supply duct (formed between the terminal end of the blade assembly 80 and the associated wall 72). The independent actuators vary the width of the supply slots independently to deliver either full velocity or restricted velocity out of each slot. This independent blade 80 control can be used to optimize the air velocities through the oven 70 for a particular product 84 (see FIG. 6) or process. For example, both slots can be fully opened for maximum airflow and faster drying. Alternatively, one slot can be opened and one partially or fully closed to direct the air to a particular part of the load 84.

Adjusting the width of the supply slot will change the air velocity and the air-delivery volume from each slot, allowing for control of the airflow patterns through the product. In contrast to the crude dampers to divert the air in conventional devices, the precision-controlled blades 80 are used on the supply ducts that vary the width of the supply-slot openings to control air volume, thus more precisely controlling the airflow out of each supply slot. These variable-width supply-air slots can be either linked in tandem or controlled independently so that the air velocities within the process chamber 70 are precisely controlled. Independent control of the slot width allows for one slot to remain fully open while the other one modulates closed and open, thus reducing wasteful static pressure build up and increasing the average velocity across the product surfaces. The speed of the independent drives can also be precision controlled, thus allowing the airflow and air velocities within the cabinet 70 to be tailored to individual product loads. For some products, it may be optimal for the airflow to dwell underneath the load, and for others it may be optimal for the airflow to dwell at the lower or upper corners of the load. For still other products or processes, it may be optimal to speed the breakpoint rapidly past some areas and go slowly past others. The precision-controlled independent supply-slot system would be capable of infinite control of these speeds and rates, and so could deliver any combination of airflows that might be found optimal for drying, cooking, or smoking in an oven. The precise control of the supply-air velocities allows the airflow to be diverted to the slower cooking areas in the oven, thus reducing temperature, color, and yield variation within the oven, while accelerating the heating rate and color development of the slowest-cooking products.

FIGS. 6 A-C are diagrammatic views of airflow patterns created using the variable-width supply duct design oven 70. In FIG. 6A, the right slot formed between the wall 72B and the blade 80B is fully closed and the left slot between the wall 72A and the blade 80A is fully open. In FIG. 6B, both slots are equally open. In FIG. 6C, the left slot is fully closed and the right slot is fully open. Moving through this exemplary sequence of input air slot openings via the precision blades 80 avoids cold zones in product 84 A and B.

Figure 7:
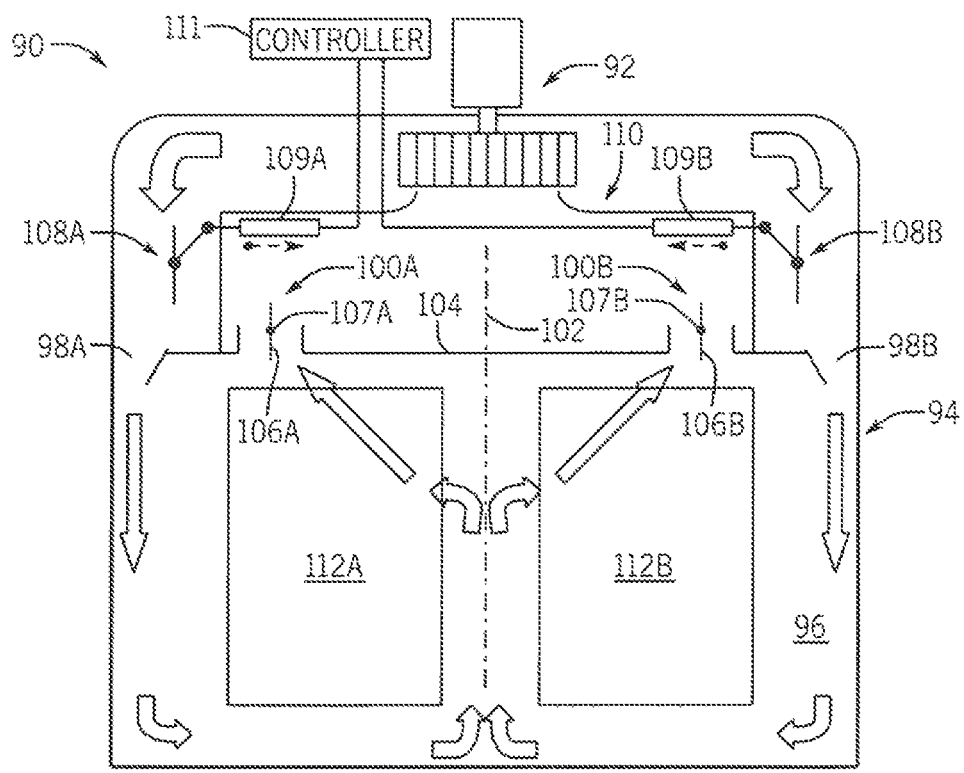
FIG. 7 is a diagram of a second embodiment of the system of the invention, including dual, side-mounted return ducts with damper-controlled airflow, again with a single fan.

FIG. 7 is a diagrammatic view of a second embodiment of a system 90 of the invention, including dual, side-mounted return ducts with damper-controlled airflow. The system 90 utilizes a single, main recirculation fan 92 in an oven 94 with an interior processing chamber 96. The oven 90 utilizes conventional fixed-width supply air ducts 98 A and B. Significantly, at least two side-mounted return ducts 100 A and B that are disposed to the sides of a centerline 102 the ceiling 104 of the oven 94 instead of conventional single return duct located in the center 102 of the ceiling 104. These side-mounted return ducts 100 A/B are equipped with independently operable dampers 106 (connected to actuators 107 A and B) to control the airflow rate, location, and direction through each side of the oven 94. The oven 94 is shown to have supply air control members 108 A and B connected to independent actuators 109 A and B. Actuators 107 and 109 are communicatively connected to an electronic controller 111. The system 90 may include a housing 110.

Figure 8A:
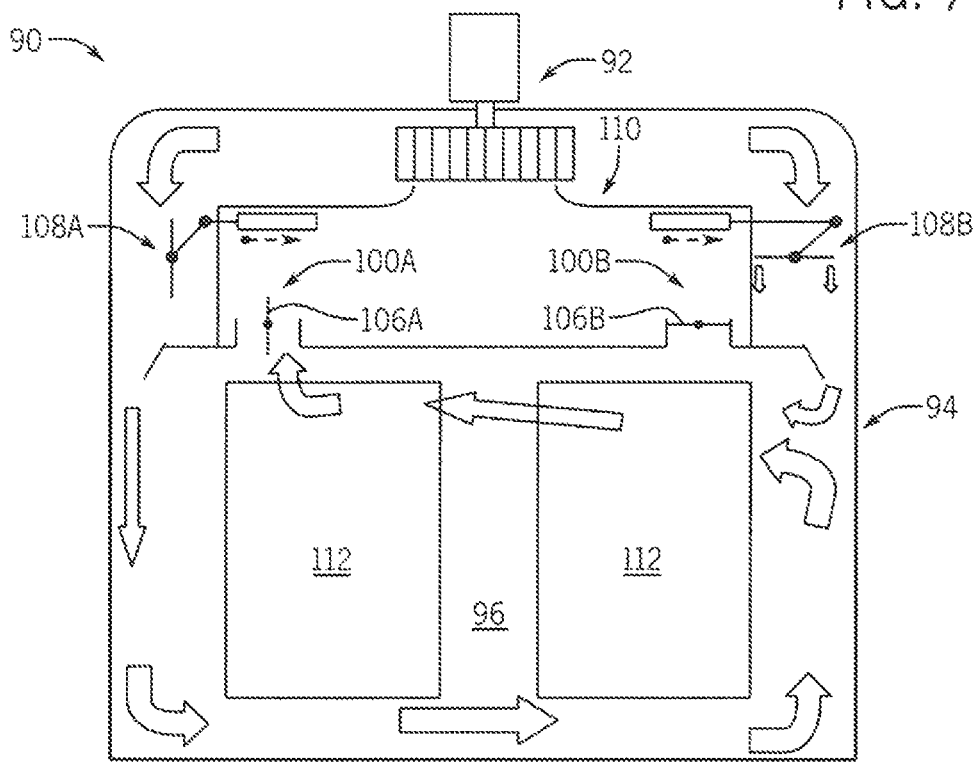
FIGS. 8 A-C are diagrammatic views of airflow patterns created using the dual, side-mounted return ducts design of FIG. 7.
Figure 8B:
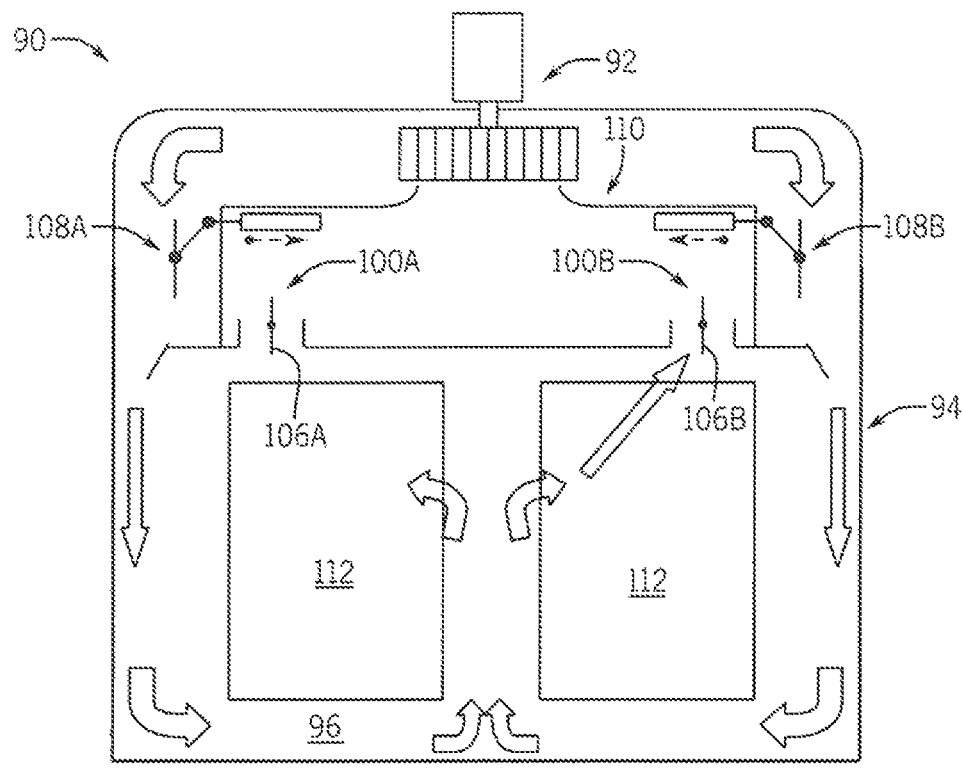
Figure 8C:
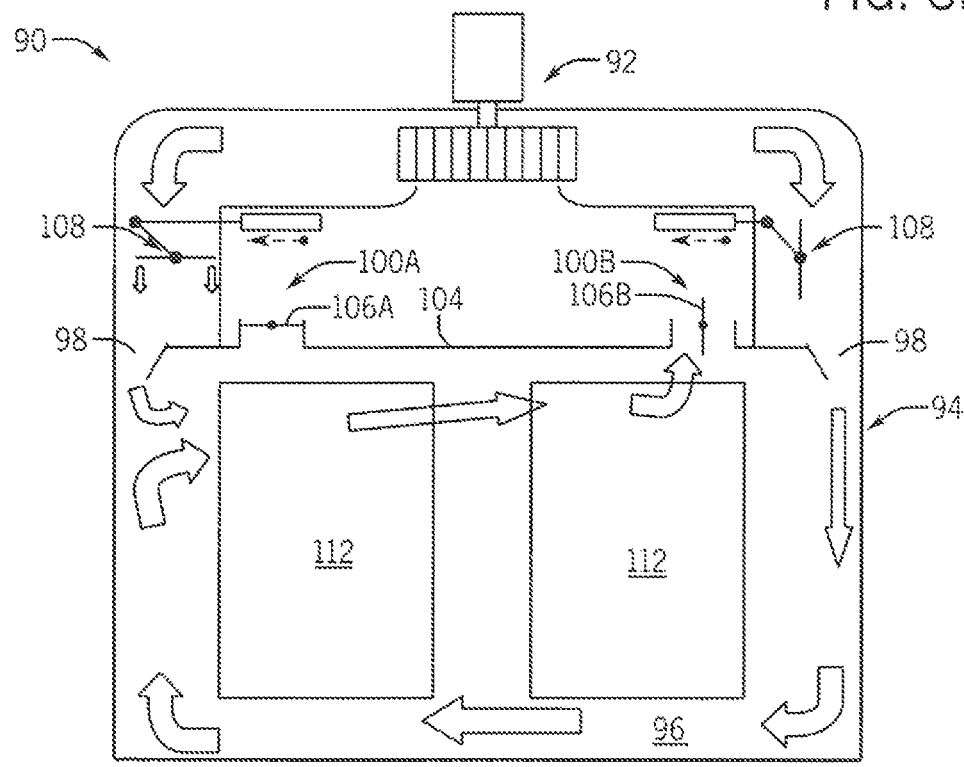

FIGS. 8 A-C are diagrams of airflow patterns created using the oven design 90 of FIG. 7, with dual, side-mounted return ducts 100. In FIG. 8A, the right return ducts damper 106B is fully closed and the left side damper 106A is fully open. In FIG. 8B, both return dampers 106 are equally and fully open. In FIG. 8C, the left return duct damper 106A is fully closed and the right side damper 106B is fully open. Moving through this sequence of return air duct openings 100 A/B via dampers 106, particularly when combined with input air slot 98 openings via controllers 108, avoids cold and hot zones in product 112 A and B.

FIGS. 13-20 illustrate a specific embodiment of the system 90 of FIGS. 7 and 8. The apparatus 190 includes an oven housing 194 enclosing a processing chamber, which is adapted to enclose a plurality of loads of product 212, for example, on movable carts. A single recirculating fan assembly 192 is disposed at the top of the oven 190 and includes an electric motor, a fan element coupled to the motor, and a housing. Return air ducts 200 are disposed to the sides of the chamber 196. Dampers 206 are arranged in the air ducts 200. In the embodiment shown, the oven 190 is ten feet (10 ft) wide, four feet (4 ft) deep, and ten feet (10 ft) tall. However, it is within the purview of the invention that ovens may be built or modified up to fifty feet (50 ft) wide with corresponding increases in height and depth.

Figure 9:
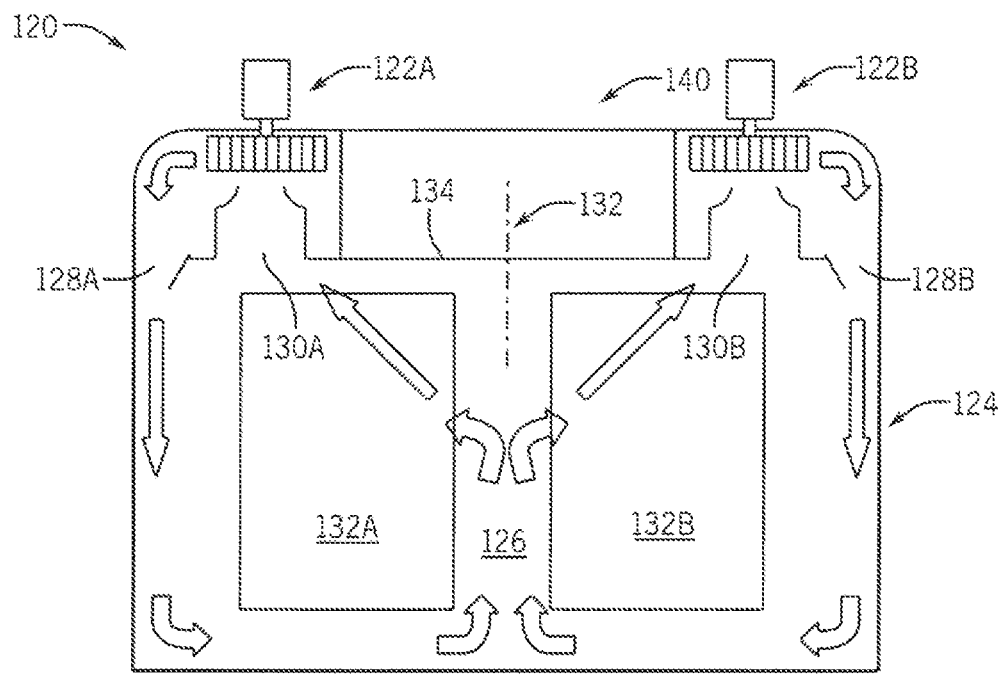
FIG. 9 is a diagram of a third embodiment of the system, including dual main fans mounted on dual, side-mounted return ducts.

FIG. 9 is a diagrammatic view of a third embodiment of the system 120 of the invention, including dual main fans mounted on dual, side-mounted, damper-less return ducts. The system 120 utilizes at least two recirculation fans 122 A and B in an oven 124 with an interior processing chamber 126. The oven 124 utilizes conventional fixed-width supply air ducts 128 A and B. Significantly, at least two side-mounted return ducts 130 A and B that are disposed to the sides of a centerline 132 of the ceiling 134 of the oven 124 instead of conventional single return duct located in the center 132 of the ceiling 134. The system 120 may include a housing 140. As shown, the dual main fans 122 both run at 100% speed. This system embodiment 120 has conventional fixed-width supply ducts 128, but has the unique side-mounted return ducts 130. The two recirculation fans 122 are speed controlled using variable speed drives. The variable speed drives independently control the airflow through the supply slots 128 from each fan 122. This embodiment of the system has no dampers in the return ducts.

Figure 10A:
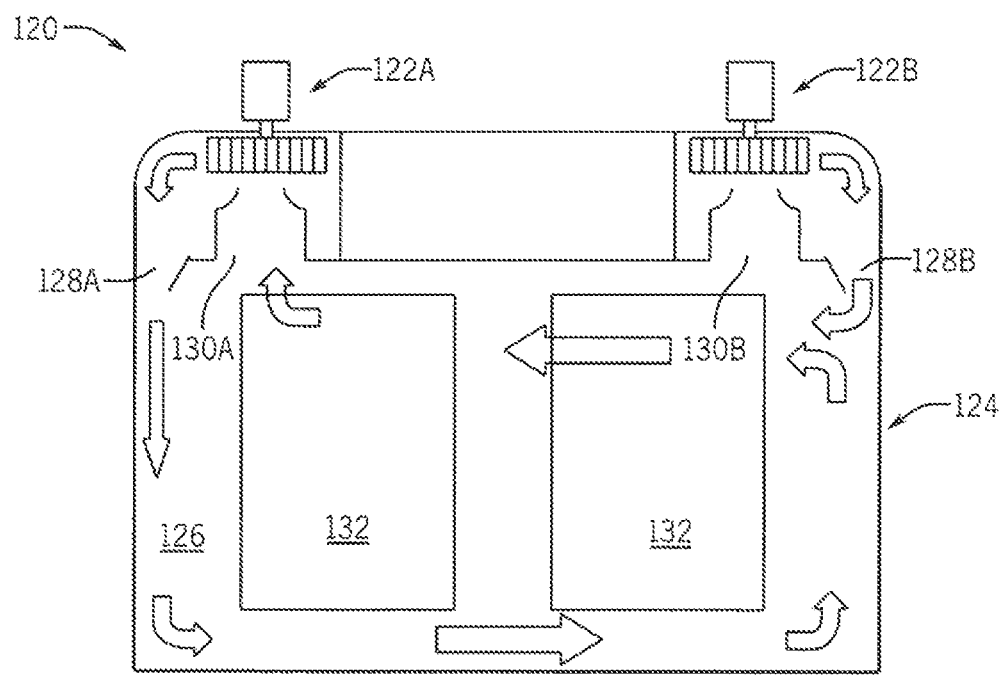
FIGS. 10 A-C are diagrammatic views of airflow patterns created using the dual fans equipped with variable speed drives and dual, side-mounted return ducts.
Figure 10B:
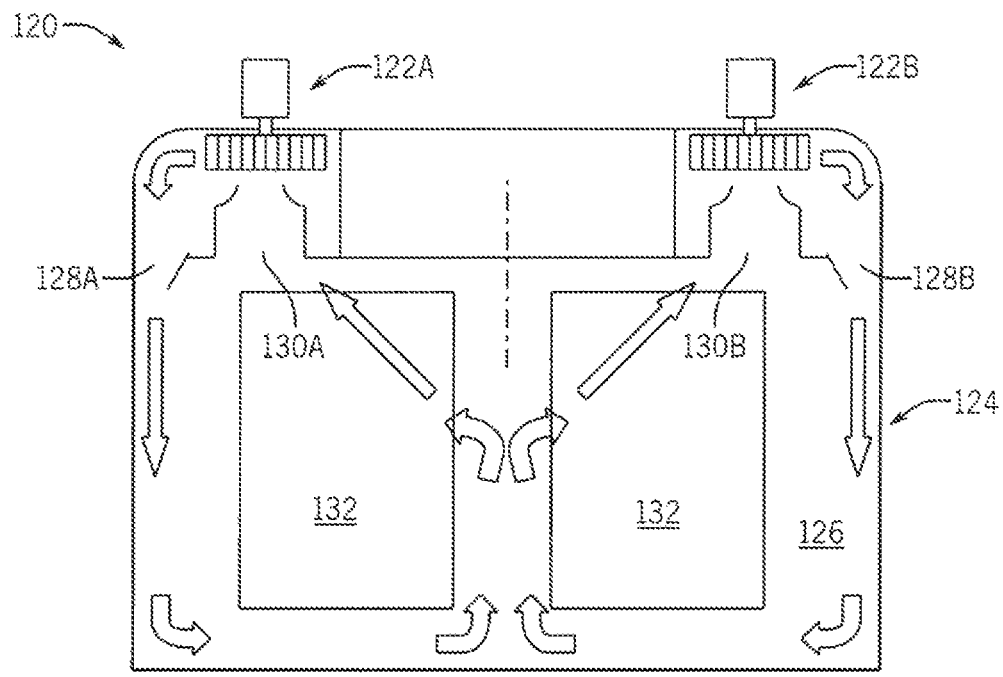
Figure 10C:
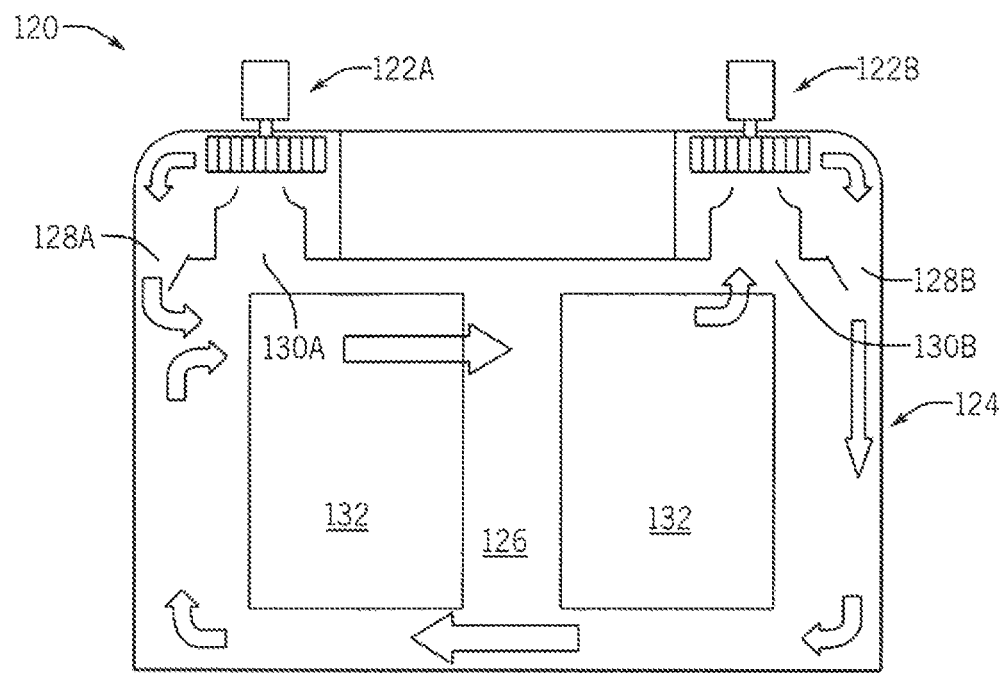

FIGS. 10 A-C are views of airflow patterns created using the oven design 120 of FIG. 9, including dual fans 122 equipped with variable speed drives and dual, side-mounted return ducts 130. In FIG. 10A, the left fan 122A is running at 100% speed and right fan 122B is running at 50%. In FIG. 10B, both fans 122 A and B are running at full speed. In FIG. 10C, the left fan 122A is running at 50% speed and right fan 122B is running at 100%. Moving through this sequence of fan 122 speeds, when combined with dual, side-mounted return ducts 130, avoids cold and hot zones in product 132 A and B.

Figure 11:
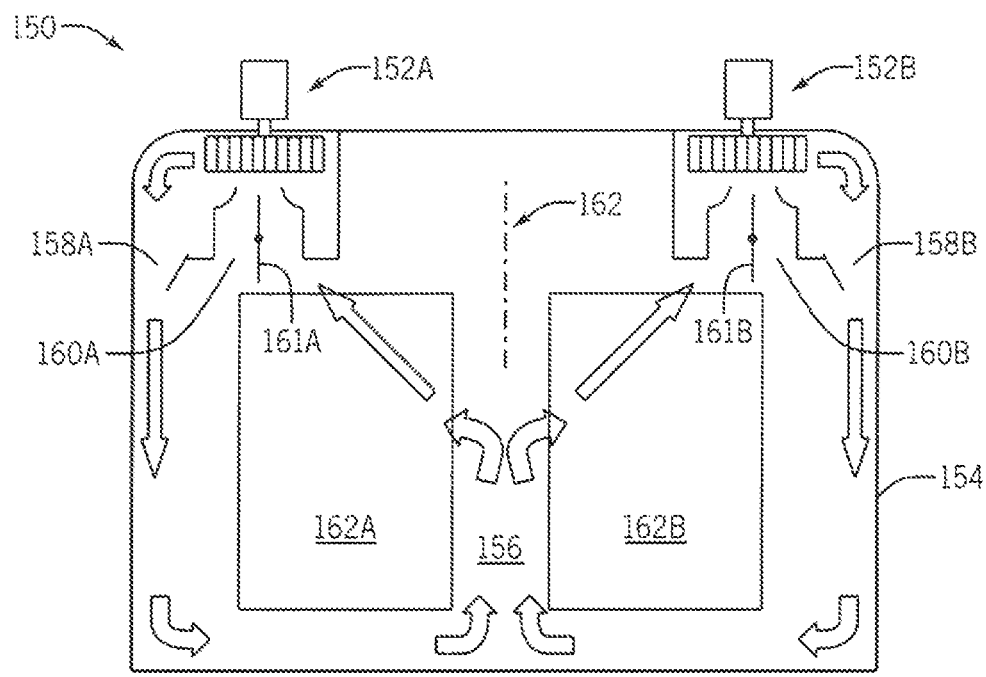
FIG. 11 is a diagram of a fourth embodiment of the system of the invention, including dual main fans mounted on dual, side-mounted return ducts, and also including independently operable dampers on the side-mounted return ducts.

FIG. 11 is a diagrammatic view of a fourth embodiment of the system of the invention, including dual main fans and dual, independently dampered, side-mounted return ducts. The system 150 utilizes at least two recirculation fans 152 A and B in an oven 154 with an interior processing chamber 156. The oven 154 utilizes conventional fixed-width supply air ducts 158 A and B. Significantly, this system embodiment 150 also has at least two side-mounted return ducts 160 A and B that are disposed to the sides of a centerline 162 of the oven 154. Of still further significance, the side-mounted return ducts 160 have dampers 161 A and B to further control the flow of process air through the process chamber 156. In this Figure, the dual main fans 152 both run at 100% speed. The two recirculation fans 152 are speed controlled using variable speed drives. The variable speed drives independently control the airflow through the supply slots 158 from each fan 152, and the dampers 161 in the side-mounted return ducts 160 control the direction of the air through the process chamber 156.

The return-air dampers 161 can be independently controlled or linked together using a chain, shaft, or other linkage. The position of the return-air alternating dampers 161 can be synchronized by using direct mechanical linkage or by independently controlling the position of actuators. Synchronization can be accomplished with a simple chain-and-sprocket arrangement or with linkage arms or shafts, or electronically controlled. The damper 161 position, open/close speed, rotation speed, and rate of change can all be controlled using variable speed drives, actuators, or controllers. The damper 161 position, open/close speed, rotation speed, and rate of change can all be controlled using precision positioning devices such as servo motors, linear-controlled actuators, or rotational actuators.

Figure 12A:
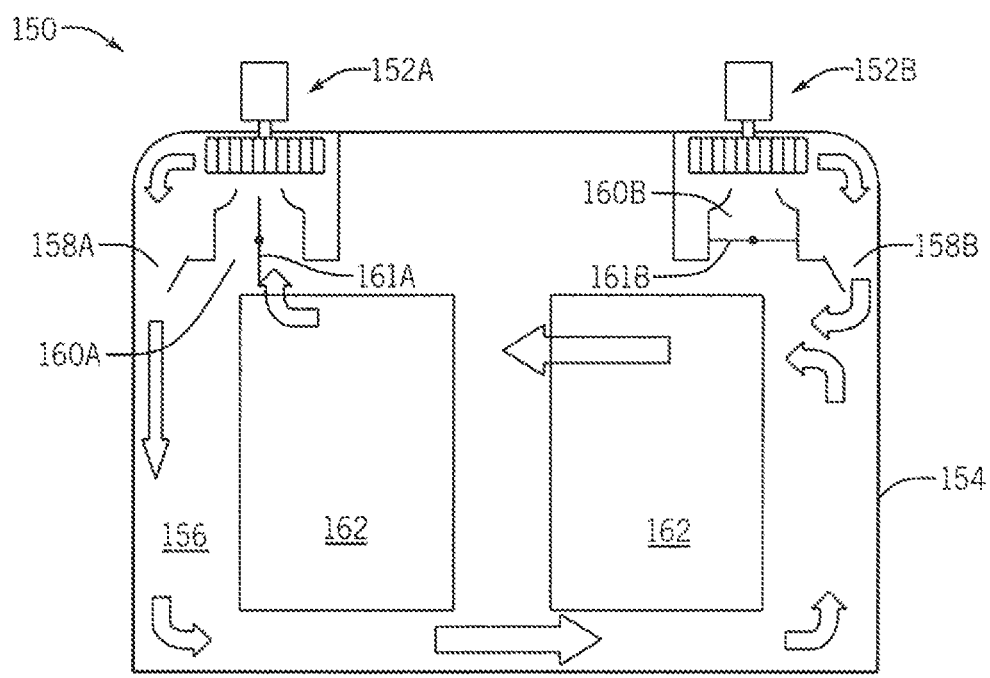
FIGS. 12 A-C are diagrammatic views of airflow patterns created using the dual fans equipped with variable speed drives and the independently dampered dual return ducts.
Figure 12B:
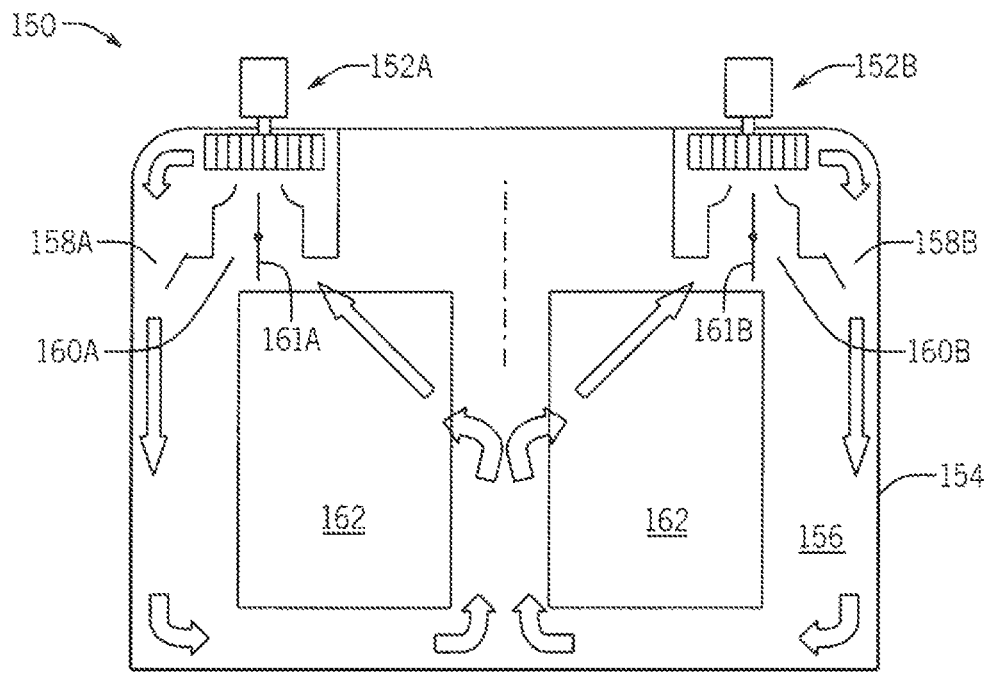
Figure 12C:
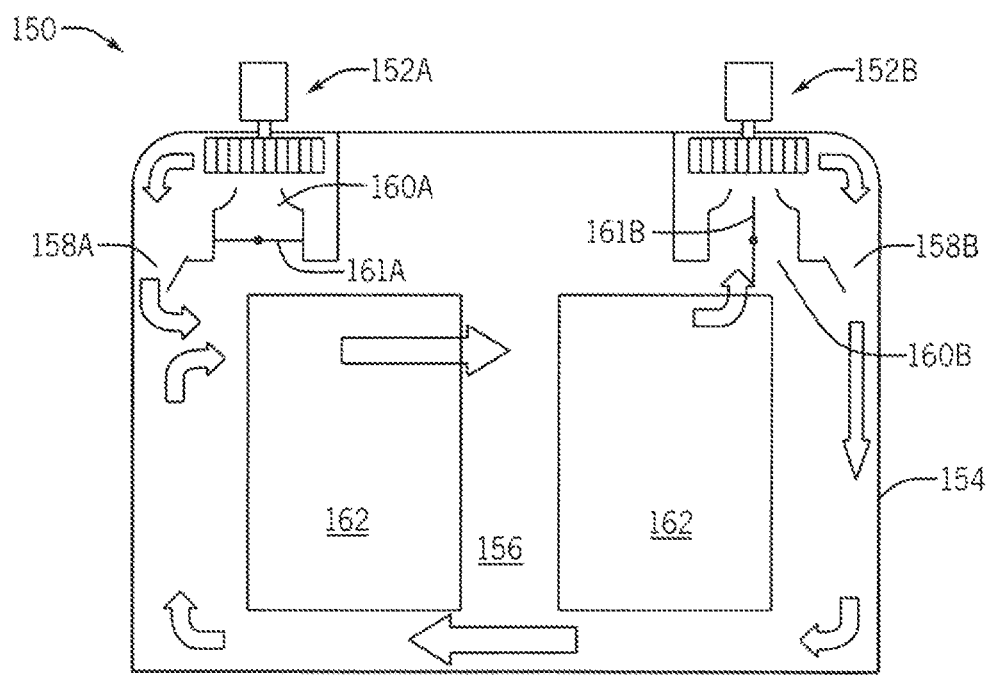
Figure 14:
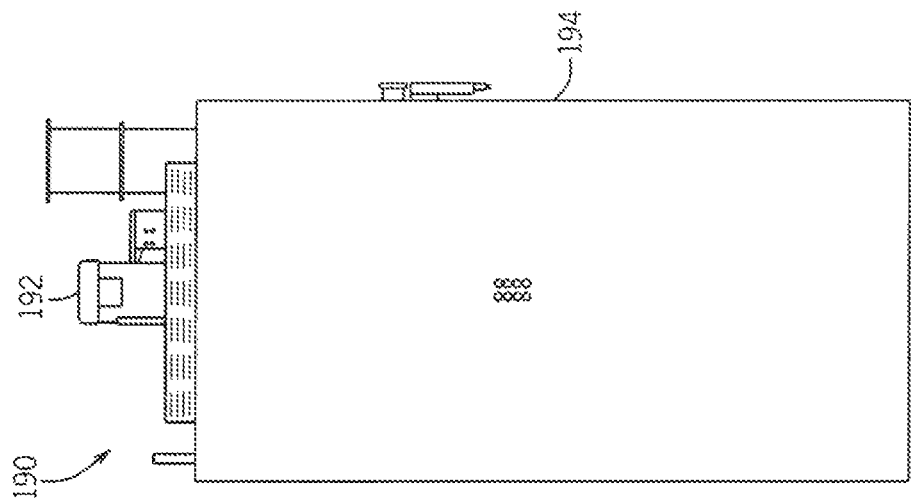
FIG. 14 is a first end view of the oven of FIG. 13.
Figure 13:
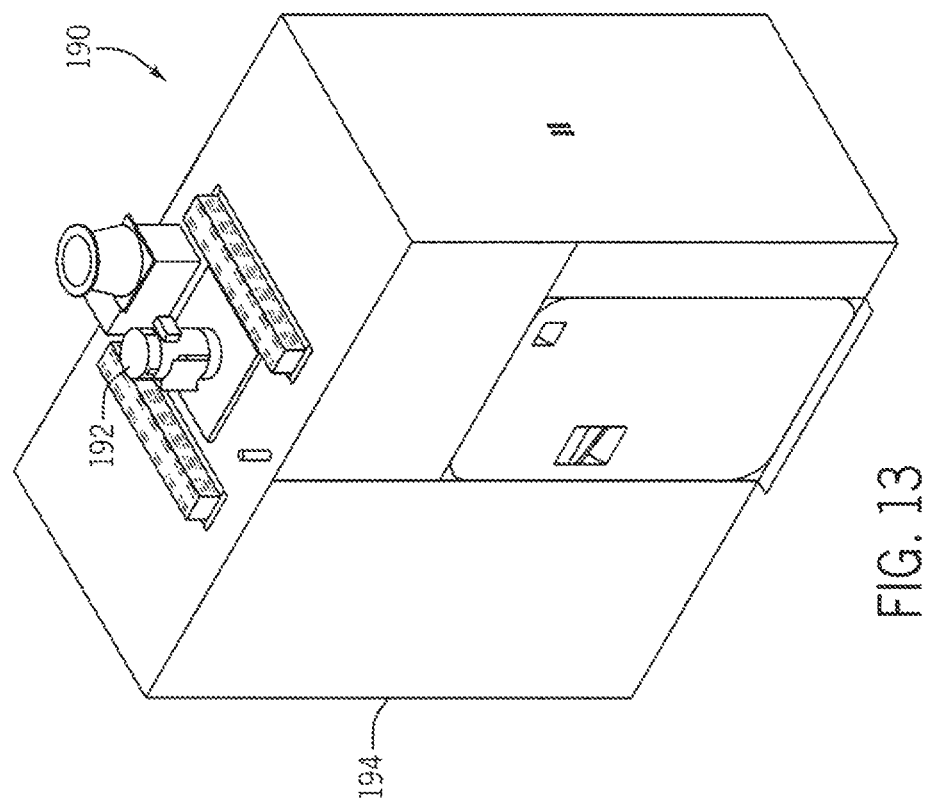
FIG. 13 is a first perspective view of an oven constructed and arranged with the aspects of the design of FIGS. 7 and 8.
Figure 15:
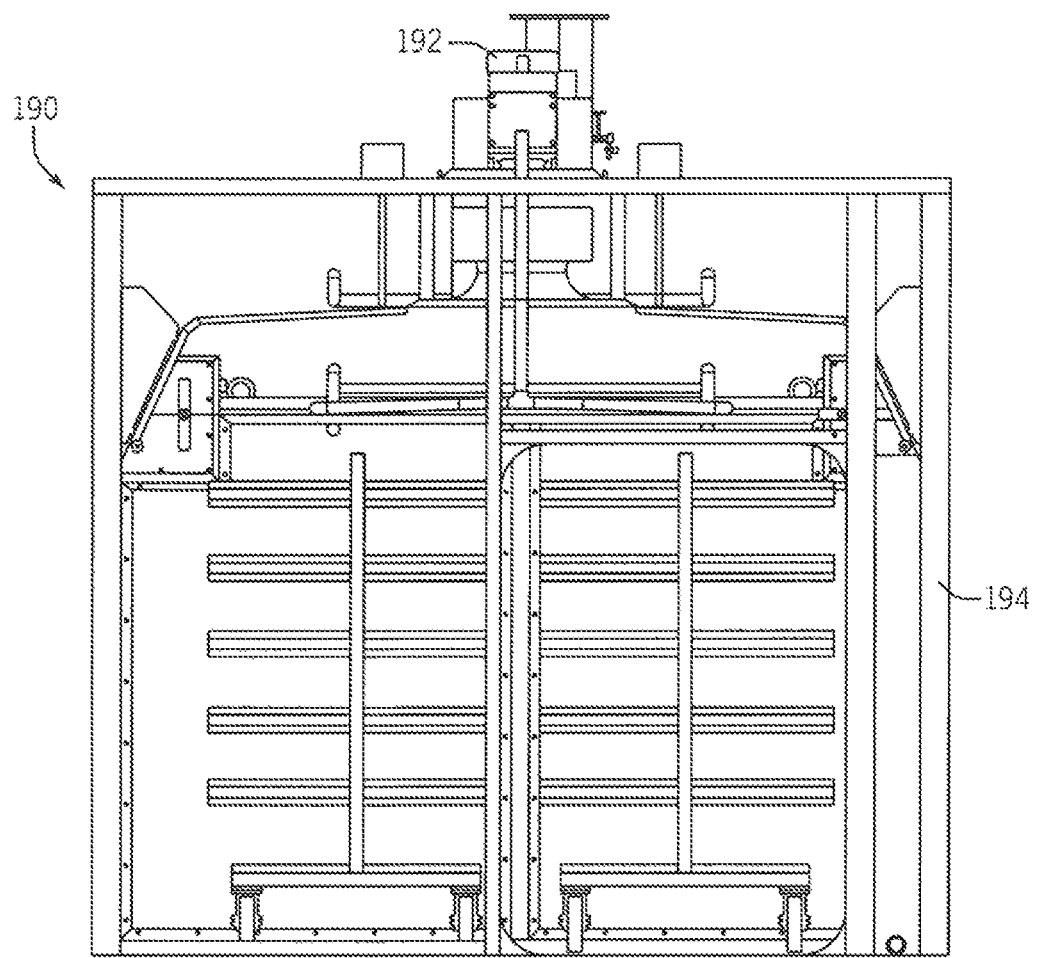
FIG. 15 shows the interior of the oven, including movable racks for holding product to be processed by the oven.
Figure 16:
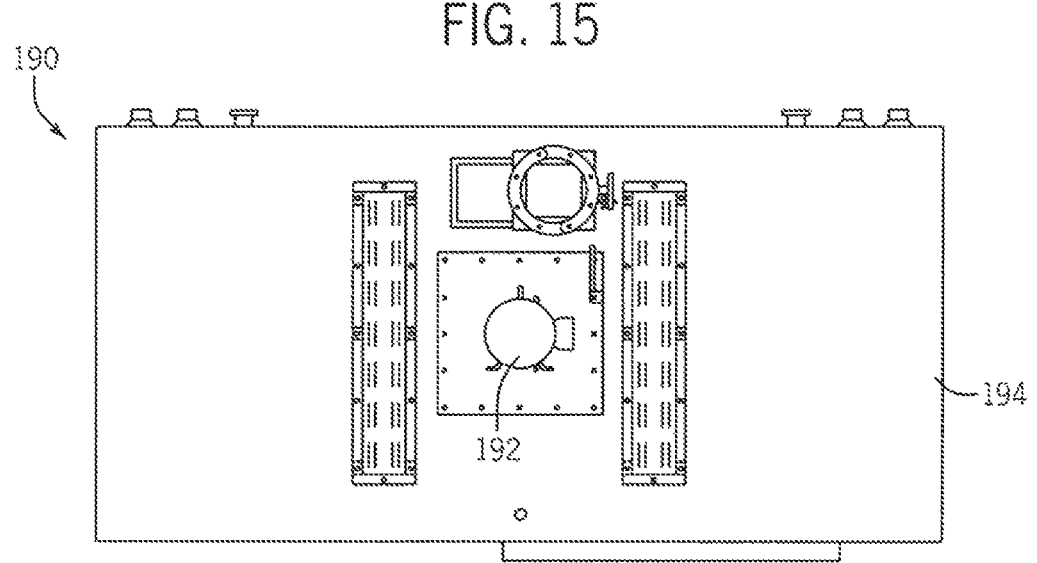
FIG. 16 is a top view of the oven.
Figure 17:
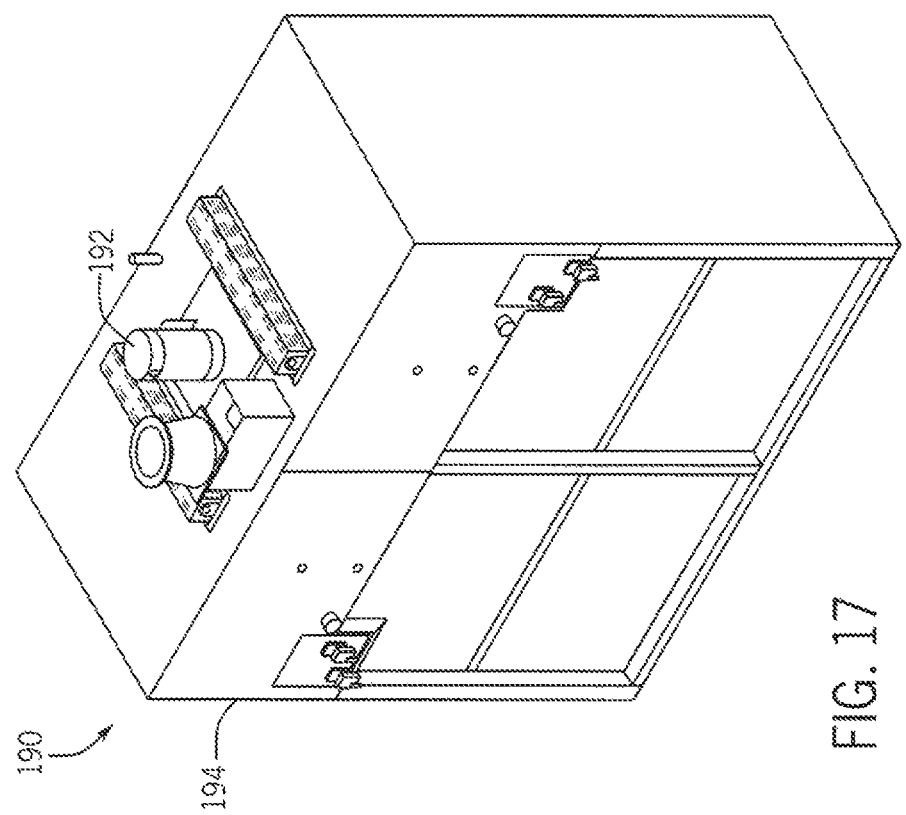
FIG. 17 is a second perspective view of the oven.
Figure 19:
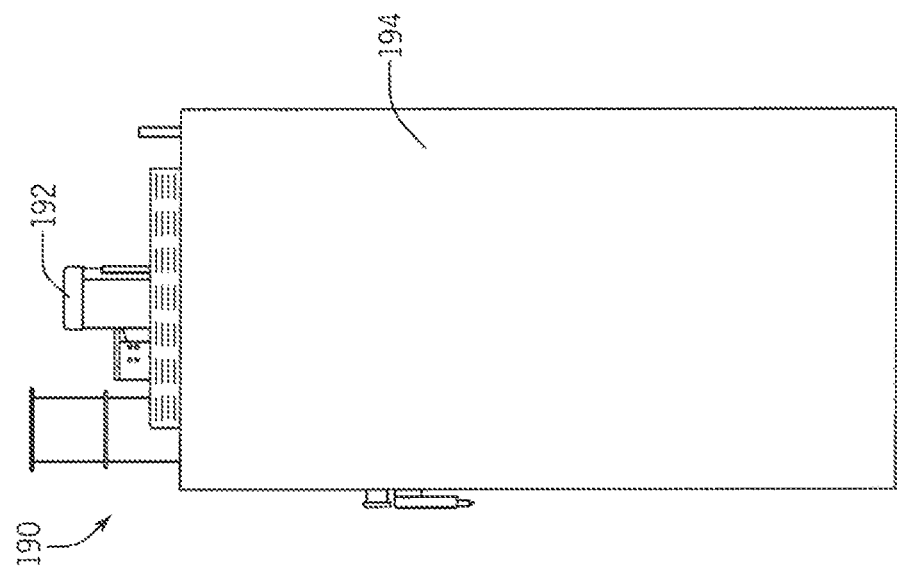
FIG. 19 is a second end view of the oven.
Figure 18:
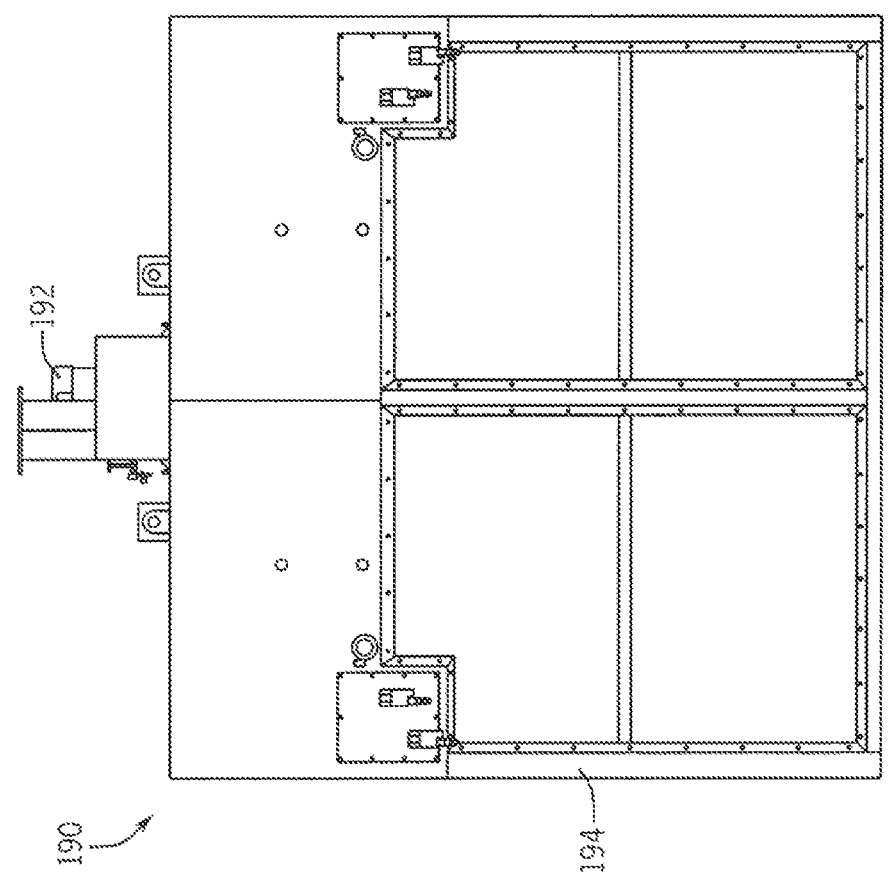
FIG. 18 is an elevation view of the oven.
Figure 20:
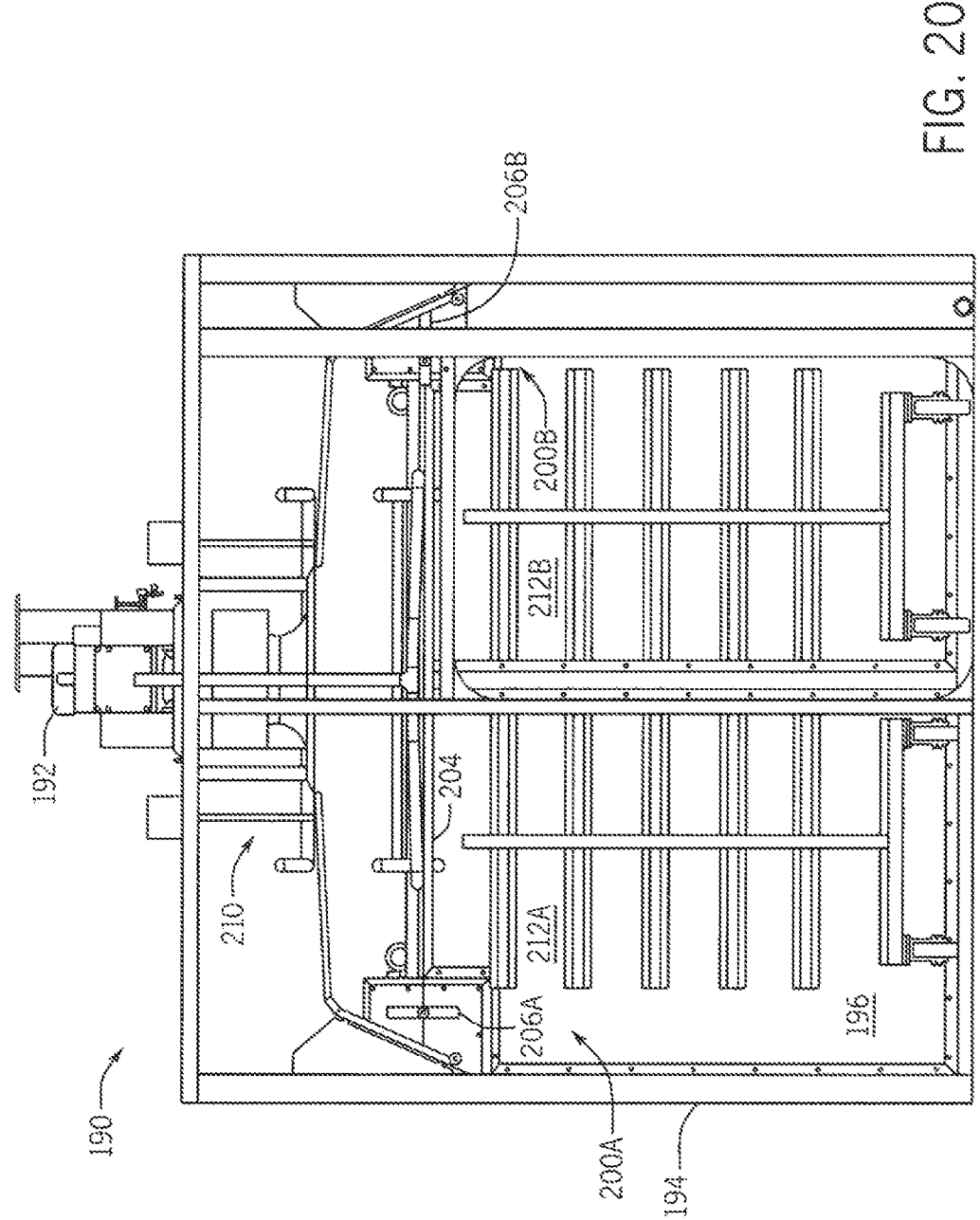
FIG. 20 is a detailed view of the interior of the oven shown in FIG. 15.

FIGS. 12 A-C are views of airflow patterns created using the oven design 150 of FIG. 11, including the dual fans 152 equipped with variable speed drives and dual, off center, return ducts 160 including independently operated return dampers 161. In FIG. 12A, the right return-duct damper 161B is fully closed and left side damper 161 A is fully open. The left fan 152A is running at 100% speed and right fan 152B is running at 50%, causing the airflow to shift to the right side of the oven. In FIG. 12B, both return dampers 161 A and B are fully open and both fans 152 A and B are running at full speed. In FIG. 12C, the left side return-duct damper 131 A is fully closed and right side damper 131B is fully open. The left fan 152A is running at 50% speed and right fan 152B is running at 100%, causing the airflow to shift to the left side of the oven. Moving through this sequence of fan 152 speeds, when combined with dual, damper 151 controlled, side return ducts 150, avoids cold zones in product 162 A and B.

FIGS. 21 A-C are diagrammatic views of a fifth embodiment of the system of the invention, including dual air supply fans and dual, independently dampered, return ducts coupled to a common return plenum. The system 250 utilizes at least two recirculation fans 252 A and B in an oven 254 with an interior processing chamber 256. The oven 254 utilizes conventional fixed-width supply air ducts 258 A and B. This embodiment 250 also has two return ducts 260 A and B communicatively connected to a common return plenum 259. The return ducts 160 have dampers 261 A and B to further control the flow of process air through the process chamber 256. The two recirculation fans 252 are speed controlled using variable speed drives. The variable speed drives independently control the airflow through the supply slots 258 from each fan 252, and the dampers 261 in the return ducts 260 control the direction of the air through the process chamber 256.

Figure 21A:
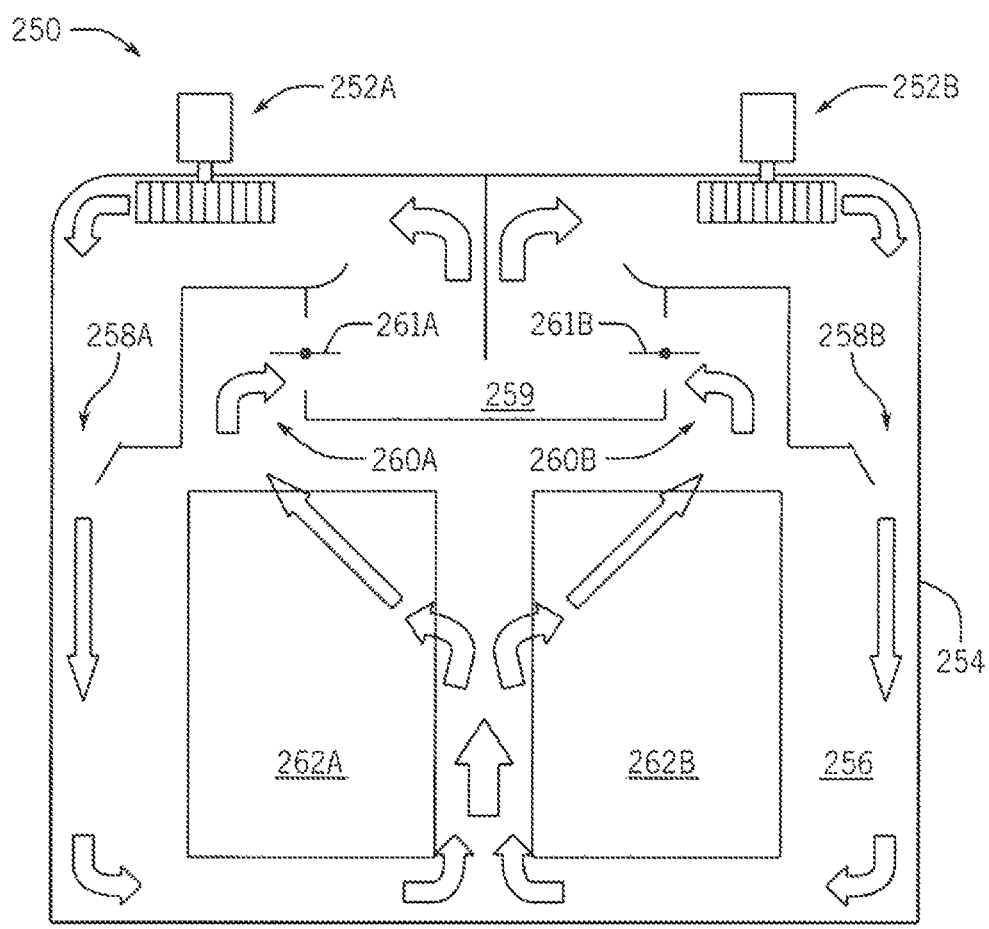
FIGS. 21 A-C are a diagrammatic view of a fifth embodiment of the system of the invention, including dual air supply fans and independently dampered dual return ducts coupled to a common return plenum, and airflow patterns generated thereby.
Figure 21B:
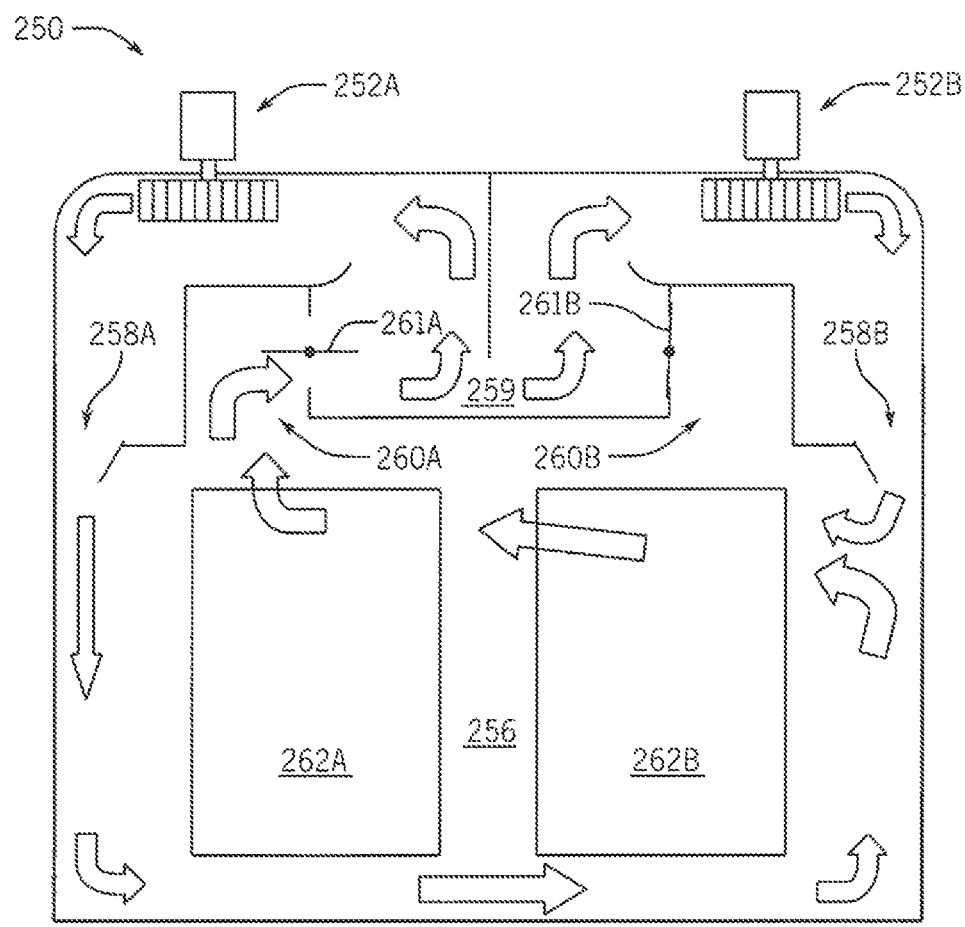
Figure 21C:
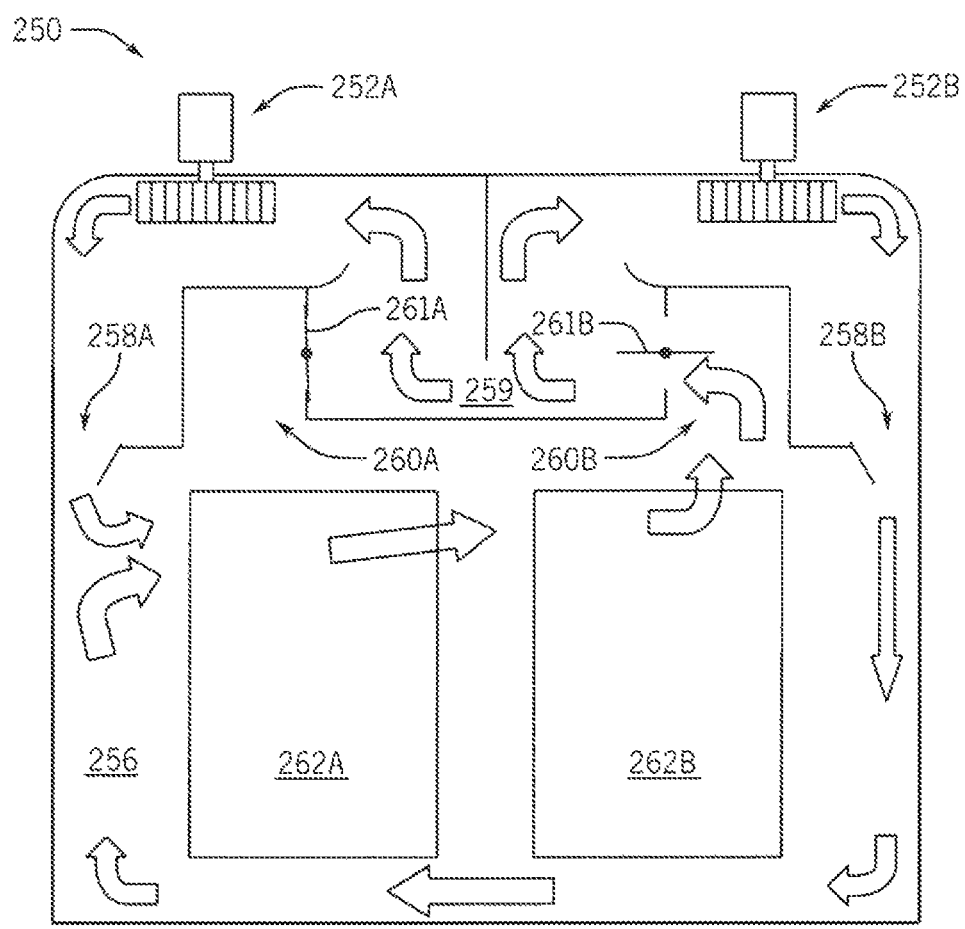

In FIG. 21A, both fans 252 are running at full speed and the return dampers 261 are both fully open. In FIG. 21B, the left fan 252A is running at 100%, while the right fan 252B is running at 50%. The left return damper 261A is fully open and the right return damper 261B is fully closed. In FIG. 21C, the left fan 252A is running at 50% while the right fan 252B is running at 100%. The left return damper 261 A is fully closed, while the right return damper 261B is fully open Moving through this sequence of fan 252 speeds, when combined with dual, damper 261 controlled, return ducts 260, avoids cold and hot zones in product 262 A and B.

Although the invention has been shown and described in the context of newly constructed ovens, it is within the purview of the invention that the systems of the invention may be applied and retrofitted to existing ovens.

The embodiments above are chosen, described, and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. An oven apparatus, comprising:
   a processing chamber adapted to contain food product to be processed,
   one fan disposed above the processing chamber;
   two air supply slots, separated a predetermined distance from each other, for continuously transmitting air generated by the fan to the processing chamber, each air supply slot having an initial predetermined supply air flow area;
   a supply damper disposed proximate each air supply slot for variably controlling the size of the supply air flow area of the air supply slot, wherein the supply dampers are independently controllable;
   at least two air return slots for returning air from the processing chamber to the fan, the at least two air return slots being disposed between the two air supply slots and off-center with respect to the fan, the two air supply slots further being disposed directly above the processing chamber and through a top side of the processing chamber, each air return slot having a predetermined return air flow area; and
   a return damper disposed proximate each air return slot for controlling the size of the return air flow area of the respective air return slot;
   whereby, in use, product in the processing chamber is exposed to air flow directly from the air supply slots simultaneously.

2. The oven apparatus of claim 1, wherein:
   a. there are two air return slots;
   b. each air return slot has an initial predetermined size, and the size of each air return slot is variable by the respective return damper to alter the airflow in the processing chamber in combination with the variable air supply slot air flow area; and
   c. the return dampers are independently controllable to vary the size of the respective return air flow area.

3. The oven apparatus of claim 2, wherein:
   b. the processing chamber has two upper corners and vertical walls extending downwardly from the upper corners a predetermined distance, and wherein the two air supply slots are defined by the vertical walls disposed below the upper corners;
   c. the supply dampers are disposed between vertical walls of the air supply slots and
   d. the processing chamber has a centerline, and the two air return slots are disposed off the centerline.

4. The oven apparatus of claim 1, further comprising an actuator connected to each supply damper.

5. The oven of claim 4, wherein the actuators are separate and work independently of each other.

6. The oven apparatus of claim 5, further comprising an electronic controller, the electronic controller being communicatively connected to each actuator.

7. The oven apparatus of claim 3, wherein the oven further comprises:
   a. a floor;
   b. side walls extending generally upwardly from the floor;
   c. a generally horizontal ceiling, the ceiling having opposing peripheral ends that are spaced apart from the side walls;
   d. a housing disposed above the ceiling; the housing having a horizontal portion and a vertical portion extending downwardly from the horizontal portion and spaced apart from the two side walls, the horizontal portion further having a fan aperture which is disposed below, and aligned with the fan; and
   f. wherein the housing vertical portion is spaced apart from the side walls to, in combination with the ceiling peripheral ends, define the two air supply slots, the distance between the housing vertical portion and the side walls comprising the initial predetermined supply air flow area.

8. The oven apparatus of claim 7, wherein the processing chamber is disposed below the ceiling and between the side walls.

9. The oven apparatus of claim 8, wherein the air return slots are disposed in the ceiling.

10. An industrial, forced-convection, controlled air flow oven apparatus for cooking, smoking, drying and processing meat and food products, comprising:
   a. a floor;
   b. side walls extending generally upwardly from the floor;
   c. a generally horizontal ceiling, the ceiling having opposing peripheral ends that are spaced apart from the side walls;
   d. a housing disposed above the ceiling; the housing having a horizontal portion and a vertical portion extending downwardly from the horizontal portion and spaced apart from the two side walls, the horizontal portion further having a fan aperture; and
   e. a processing chamber adapted to contain food product to be processed, the processing chamber being disposed below the ceiling and between the side walls, and having
      i. a centerline, and
      ii. two upper corners and walls extending downwardly from the upper corners a predetermined distance,
   f. one fan disposed in the fan aperture of the housing above the processing chamber;
   g. two air supply slots in direct fluid communication with the processing chamber, separated a predetermined distance from each other and proximate respective sides of the processing chamber, for continuously transmitting air generated by the fan to the processing chamber, each air supply slot having an initial predetermined supply air flow area, each air supply slot further having a geometry with a predetermined width, and wherein the two air supply slots are defined by the vertical walls disposed below the upper corners in combination with the ceiling peripheral ends, the distance between the housing vertical portion and the side walls comprising the initial predetermined supply air flow area;
   h. a supply damper disposed proximate each air supply slot, and between the vertical walls of each air supply slot, for variably controlling the size of the supply air flow area of the respective air supply slot, the damper in use changing the width of the respective air supply slot, wherein the supply dampers are operable independently of each other;
   i. two air return slots for returning air from the processing chamber to the fan, the two air return slots being disposed in the ceiling, between the two air supply slots and off center with respect to the fan and with respect to the centerline of the processing chamber, the air supply slots further being disposed directly above the processing chamber and through a top side of the processing chamber, each air return slot having a predetermined return air flow area, each air return slot further having an initial predetermined size, and the size of each air return slot is variable to alter the airflow in the processing chamber in combination with the variable air supply slot air flow area;
   j. a return damper disposed proximate each air return slot for varying the size of the return air flow area of the respective air return slot;
   k. a control assembly comprising an actuator connected to each supply damper, and an electronic controller communicatively connected to each actuator, the actuators functioning independently of each other under the control of the electronic controller;
   l. whereby, in use, product in the processing chamber is exposed to air flow directly from the air supply slots simultaneously; and
   m. whereby, in use, the oven minimizes formation of relatively cold and hot zones in food product disposed in the processing chamber by ensuring that airflow is provided horizontally, vertically, and diagonally.

11. The industrial, forced-convection, controlled air flow oven apparatus of claim 10, wherein the independently variable air supply slots permit control of the velocity and volume of incoming air, the air supply slots having the following air flow areas states:
   a. fully open, to dwell airflow in the product chamber underneath the food product,
   b. fully closed, to dwell airflow in the product chamber on top of the food product,
   c. partially open and partially closed, to move a temperature breakpoint rapidly across a predetermined volume of food product, and
   d. modulating between fully open and fully closed, to move a temperature breakpoint slowly across a predetermined volume of food product;
   whereby airflow is capable of being tailored to particular food product in the processing chamber via the independently variable air supply slots.

12. The industrial, forced-convection, controlled air flow oven apparatus of claim 11, wherein the oven is at least ten feet wide, four feet deep, and ten feet tall, and food product is adapted to be received in the processing chamber in plural movable carts.

* * * * *